(12) United States Patent
Feldmann et al.

(10) Patent No.: US 11,626,746 B2
(45) Date of Patent: Apr. 11, 2023

(54) SYSTEM FOR A VEHICLE

(71) Applicant: AUDI AG, Ingolstadt (DE)

(72) Inventors: Uwe Feldmann, Nassenfels (DE);
Franz Honkomp, Ingolstadt (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 17/551,237

(22) Filed: Dec. 15, 2021

(65) Prior Publication Data
US 2022/0294247 A1 Sep. 15, 2022

(30) Foreign Application Priority Data
Mar. 15, 2021 (DE) .......................... 102021106259.4

(51) Int. Cl.
*H02J 7/00* (2006.01)
*B60L 50/60* (2019.01)
(Continued)

(52) U.S. Cl.
CPC ............ *H02J 7/0068* (2013.01); *B60L 50/60* (2019.02); *B60L 53/16* (2019.02); *B60L 53/20* (2019.02);
(Continued)

(58) Field of Classification Search
CPC ..... H02J 7/0068; H02J 2207/20; B60L 50/60; B60L 53/16; B60L 53/20; B60L 53/24; B60L 53/62; B60L 2210/10; B60L 2210/40; Y02T 10/70; Y02T 10/7072; Y02T 10/72; Y02T 90/12; Y02T 90/14
See application file for complete search history.

(56) References Cited

U.S. PATENT DOCUMENTS 9,472,365 B1 10/2016 Lopez et al.
2019/0241085 A1* 8/2019 Hiroe .................... B60L 53/11

FOREIGN PATENT DOCUMENTS

DE 102010019296 A1 3/2011
DE 102010025198 A1 12/2011
(Continued)

OTHER PUBLICATIONS

German Search Report dated Sep. 20, 2021 in corresponding German Application No. 102021106259.4; 18 pages; Machine translation attached.

*Primary Examiner* — Lincoln D Donovan
*Assistant Examiner* — Alex W Lam
(74) *Attorney, Agent, or Firm* — Maier & Maier, PLLC

(57) ABSTRACT

A system for a vehicle, which has a battery, a DC-DC converter, a DC-AC converter, an electric motor, and a switch. The battery is connected to the DC-DC converter and the DC-AC converter is connected to the electric motor. The switch is arranged between the DC-DC converter and the DC-AC converter, and the switch is designed, in a first switching state, to electrically connect the DC-DC converter and the DC-AC converter and to permit an exchange of electrical energy between the battery and the electric motor in order to carry out a traction process. The switch is designed, in a second switching state, to electrically isolate the DC-DC converter and the DC-AC converter, to connect the battery to an electrical charging station, and to permit an exchange of electrical energy between the battery and the electric charging station in order to carry out a charging process.

15 Claims, 3 Drawing Sheets

(51) Int. Cl.
*B60L 53/16* (2019.01)
*B60L 53/62* (2019.01)
*B60L 53/24* (2019.01)
*B60L 53/20* (2019.01)

(52) U.S. Cl.
CPC ............... *B60L 53/24* (2019.02); *B60L 53/62* (2019.02); *B60L 2210/10* (2013.01); *B60L 2210/40* (2013.01); *H02J 2207/20* (2020.01)

(56) References Cited

FOREIGN PATENT DOCUMENTS

| DE | 102015207413 A1 | 10/2016 |
| DE | 102016122008 A1 | 5/2018 |
| DE | 102018203039 A1 | 9/2019 |
| DE | 102018205063 A1 | 10/2019 |
| DE | 102018210644 A1 | 1/2020 |

* cited by examiner

SYSTEM FOR A VEHICLE

FIELD

The invention relates to a system for a vehicle and a method for supplying a vehicle with electrical energy.

BACKGROUND

An electrically driven vehicle has an electric motor that is provided with electrical energy from a battery of the vehicle. In this case, it is necessary to regularly connect this battery to an electrical charging station and charge it.

A power supply device with different battery types is known from publication DE 10 2010 019 296 A1.

Publication DE 10 2010 025 198 A1 describes a motor vehicle electrical system and a method for operating a motor vehicle electrical system.

A method for charging a high-voltage battery in a traction network and a traction network are described in publication DE 10 201 8 210 644 A1.

SUMMARY

Against this backdrop, an object was to make the supply of a vehicle with electrical energy more efficient.

The system according to the invention is designed for a vehicle, for example a motor vehicle, this system having a battery, a DC-DC converter or a direct current to direct current converter, a DC-AC converter or a direct current to alternating current converter, an electric motor, and a switch. In this case, the battery is electrically connected to the DC-DC converter, and the DC-AC converter is electrically connected to the electric motor. The switch is arranged between the DC-DC converter and the DC-AC converter and is electrically connected to both of the converters mentioned. In a first switching state, the switch is designed to electrically connect the DC-DC converter and the DC-AC converter and to permit an exchange of electrical energy between the battery and the electric motor via the two converters in order to carry out a traction process for the vehicle. In a second switching state, the switch is designed to electrically isolate the DC-DC converter and the DC-AC converter from one another and to electrically connect the battery to a usually stationary electrical charging station and to permit an exchange of electrical energy between the battery and the charging station in order to carry out a charging process.

In a further embodiment, the system has a charging plug that is connected to the switch. In the second switching state, when the charging process is being carried out, the switch is designed to electrically connect the battery to the charging plug via the DC-DC converter, the charging plug being connected to the charging station. In the first switching state of the switch, when the traction process is being carried out, the switch is designed to electrically connect the battery to the DC-AC converter via the DC-DC converter.

It is also possible that the switch is designed to increase or decrease an electrical voltage, for example an electrical voltage of the battery, the electric motor, and/or the charging station, depending on the switching state, and thus increase or reduce the voltage.

In a further refinement, the system has a mechanism which is designed to automatically detect a change between the traction process and the charging process and a change between the charging process and the traction process and, based on this, to automatically set a switching state provided for the switch.

The system presented is designed for a combined charging and traction network of the vehicle.

The method according to the invention is designed with a system to supply a vehicle with electrical energy, the system having a battery, a DC-DC converter or DC-DC converter, a DC-AC converter or a DC-AC converter, an electric motor, and a switch. Using this system, the battery is connected to the DC-DC converter and the DC-AC converter is connected to the electric motor. In addition, the switch is arranged between the DC-DC converter and the DC-AC converter. In a first switching state of the switch, the DC-DC converter and the DC-AC converter are electrically connected to one another, with the switch enabling an exchange of electrical energy between the battery and the electric motor via the two converters in order to perform a traction process. In a second switching state of the switch, the DC-DC converter and the DC-AC converter are electrically isolated from one another and the battery is connected to an electrical charging station. In this case, with the switch in its second switching state in order to carry out a charging process, an exchange of electrical energy is permitted between the battery and the electrical charging station.

The method presented is usually carried out with an embodiment of the system presented above. In one embodiment of the method, the electric motor is supplied with electrical energy from the battery in the first switching state and when the traction process is being performed. In addition, the battery is supplied with electrical energy from the charging station in the second switching state and when the charging process is being performed.

In a further embodiment, it is possible for the first switching state of the switch to be set automatically while the vehicle is in motion and the second switching state of the switch to be set automatically during the charging process of the vehicle.

In a further embodiment of the method, it is also possible for the switch to automatically set the second switching state starting from the first switching state when a charging cover of the system is opened and/or when a charging plug of the system is in contact with the charging station. Conversely, it is possible for the switch to automatically set the first switching state starting from the second switching state when the charging plug of the system is disconnected from the charging station and/or when the charging cover of the system is closed.

For this purpose, it is provided that the charging plug and/or the charging cover is or are connected to the mechanism described above. This mechanism usually makes it possible to use sensors to detect whether the charging cover is open or closed and/or whether the charging plug has contact with the charging station or is disconnected therefrom. Depending on this, a respectively intended switching state is set for the switch via the mechanism. The charging plug forms an interface between the system and the usually stationary charging station, for example a charging column, the charging plug of the system being connected to a charging socket or socket of the charging station in order to carry out the charging process. The charging cover is usually arranged in an outer wall or body of the vehicle and is opened to carry out the charging process and closed while the vehicle is in motion.

The system presented here provides a DC-DC converter for combined use in an HV or high-voltage charging network and an HV or high-voltage traction network for an electrically powered vehicle. For this purpose, the DC-DC converter is positioned in the vehicle according to a topology of the system and the switch is added to the vehicle. In this case, it is possible to use the DC-DC converter for traction purposes as well as for charging the vehicle.

The system presented is provided as part of a drive for the electric vehicle, an increase in performance being possible for this drive by providing the system. The range of the vehicle can also be optimized through improved efficiency. In addition, an increase in power availability and thus an improved continuous output of the vehicle can also be achieved. In addition, costs for the vehicle can be minimized if the DC-DC converter is already available in the vehicle's charging network. To provide the system, it is possible to add the described switch to an existing charging network of the vehicle, which already has a DC-DC converter and a DC-AC converter, to arrange this switch between the two converters mentioned, and to have electrical contact with the two converters.

Depending on the current operating mode of the vehicle, the switch of the system is designed to connect the DC-DC converter to the charging plug and thus also to the charging station or a charging socket of the charging station in order to carry out the charging process, which is a direct current charging process in this case. In a further operating mode of the vehicle, in driving mode in this case, the switch is designed to connect the DC-DC converter to the DC-AC converter. Depending on the topology of the DC-DC converter used, different variants of the system and/or the method can be implemented, with the DC-DC converter being installed or arranged accordingly in the vehicle depending on the topology. In one embodiment, the DC-DC converter installed in the vehicle is designed to both increase and decrease the voltage, the DC-DC converter in this case being designed and/or designated as a buck-boost converter, for example. Switching to the operating mode for carrying out the charging process takes place, for example, when the charging cover is opened and/or the charging plug is in contact with the charging station. Since no load current flows at any given point in time before the charging plug is in contact with the charging station, it is possible to design the switch in a simple manner.

It is apparent that the above-mentioned features, which will be explained hereinafter, are usable not only in the respectively specified combination but also in other combinations or alone, without leaving the scope of the present invention.

BRIEF DESCRIPTION OF THE FIGURES

The invention is illustrated schematically and described in detail in the set of drawings on the basis of embodiments and with reference to the drawings.

The figures are described coherently and comprehensively. The same reference numerals are assigned to the same components.

DETAILED DESCRIPTION

Figure 1:
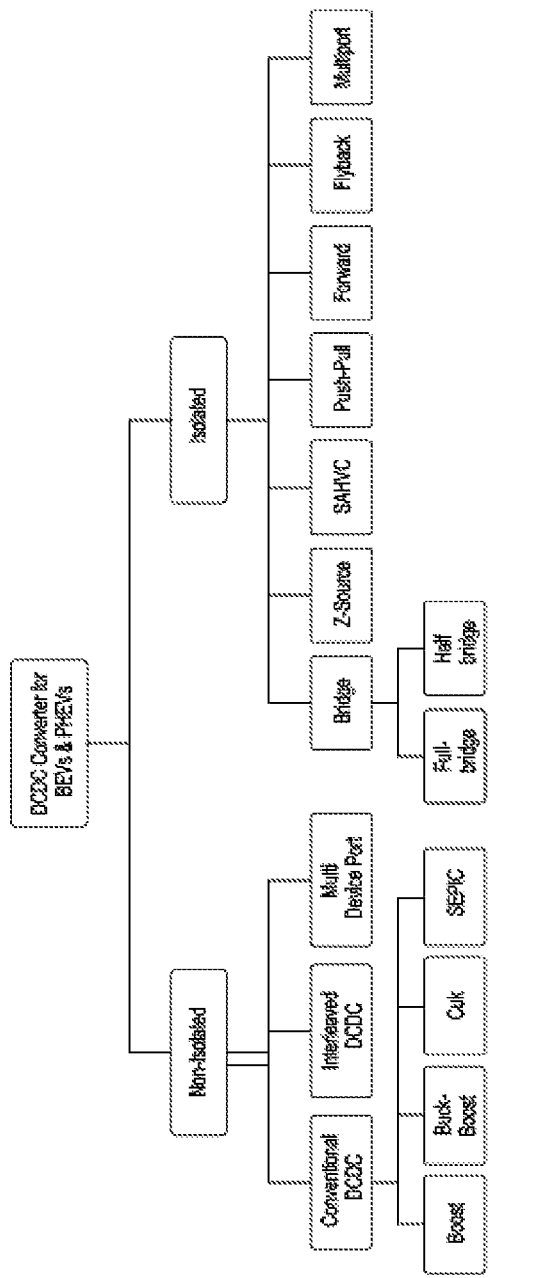
FIG. 1 shows a schematic representation of an overview of the topologies of a DC-DC converter.

The diagram from FIG. 1 shows examples of DC-DC converters for electrically powered vehicles, e.g. battery-operated electric vehicles (BEV, Battery Electric Vehicle) and plug-in hybrid vehicles (PHEV, Plug-in Hybrid Electric Vehicle). A distinction is made between non-isolated DC-DC converters and isolated DC-DC converters. In this case, non-isolated DC-DC converters are designed, for example, as conventional DC-DC converters. In one embodiment, it is possible for such non-isolated DC-DC converters to be designed, for example, as interleaved or nested DC-DC converters or multi-device/port converters or multi-device/access converters. A conventional DC-DC converter can be designed as a boost converter, a buck-boost converter, a Ćuk converter, or an SEPIC converter. Isolated DC-DC converters can be designed as bridge converters, as Z sources, as SAHVC converters, or as multiport or multi-access converters, which can also be selected for electric vehicles. Further DC-DC converters are so-called push-pull converters, forward converters, or flyback converters. A bridge converter can be designed as a full bridge converter or a half bridge converter.

Figure 2:
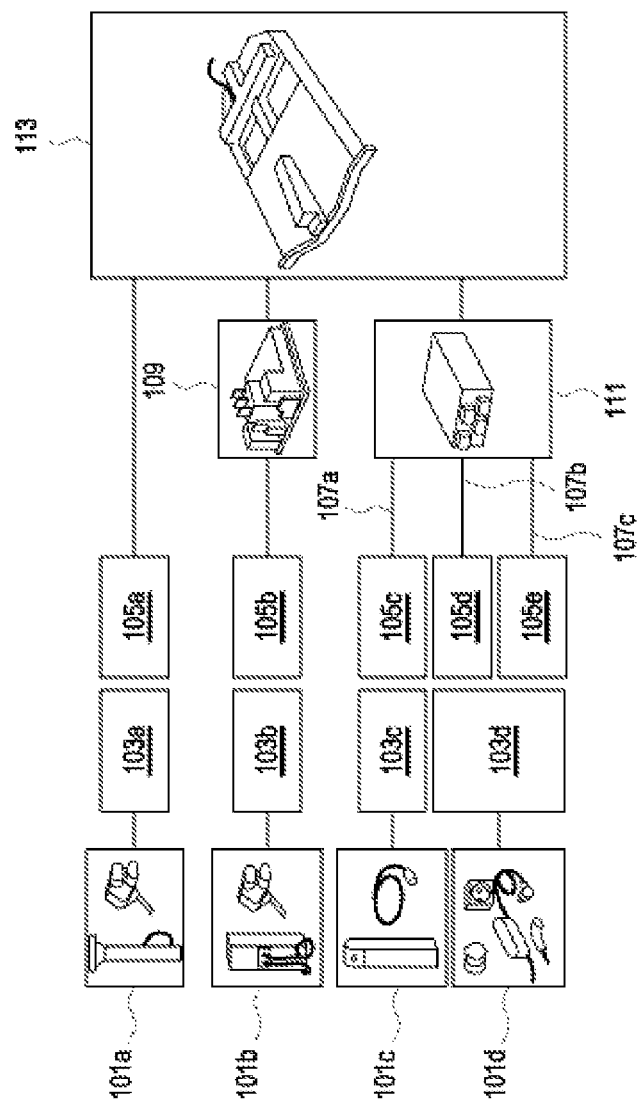
FIG. 2 shows a schematic illustration of an example of a DC-DC converter in a high-voltage charging network of a vehicle.

FIG. 2 shows a schematic representation of a battery 113, a high-voltage battery in this case, for a motor vehicle that is driven by an electric motor. For this purpose, the vehicle also has a DC charger 109 or a direct current charger or an AC charger 111 or an alternating current charger. In addition, FIG. 2 shows different examples of a charging infrastructure 101a, 101b, 101c, 101d, a first, a second, and a third charging infrastructure 101a, 101b, 101c each having a charging column and a charging cable with a charging socket. A fourth embodiment of the charging infrastructure 101d is provided for a house connection and comprises a normal socket or a socket for working current. This fourth charging infrastructure 101d also includes a charging cable.

To carry out a charging process for the vehicle, its charging plug must be connected to a charging socket or socket of a respective charging infrastructure 101a, 101b, 101c, 101d via a respective charging cable in order to carry out the charging process for the battery 113 of the vehicle. Depending on a respective charging infrastructure 101a, 101b, 101c, 101d, a respective voltage mode 103a, 103b, 103c, 103d is provided. In addition, correspondingly different charging powers 105a, 105b, 105c, 105d, 105e are provided for carrying out a respective charging process with a respective charging infrastructure 101a, 101b, 101c, 101d.

To carry out a charging process for the battery 113, it can optionally be connected to one of the four charging infrastructures 101a, 101b, 101c, 101d presented. If the battery 113 is connected to the first charging infrastructure 101a, a direct voltage of 800 V with a first charging power 105a of up to 270 kW is provided in a first voltage mode 103a, in which it is possible in this case to connect the battery 113 directly to the charging cable of this first charging infrastructure 101a. If the battery 113 is to be charged by the second charging infrastructure 101b, the battery is connected to the cable of this second charging infrastructure 101b via the DC charger 109. With a second voltage mode 103b, a direct voltage of 400 V is provided with a second charging power 105b of up to 150 kW. If the battery 113 is to be charged with the third charging infrastructure 101c, the battery 113 is connected to the charging cable of this third charging infrastructure 101c via the AC charger 111 and a three-phase connection 107a, in which an alternating voltage of 240 V is provided by the third charging infrastructure 101c in a third voltage mode 103c, with a third charging power 105c being up to 11 kW. If the battery 113 is to be charged with the fourth charging infrastructure 101d, it is possible to connect the battery 113 to this fourth charging infrastructure 101d via the AC charger 111, via a single-phase or three-phase connection 107b, or via a single-phase connection 107c. This fourth charging infrastructure 101d provides an alternating voltage of 240 V in a fourth voltage mode 103d. In this case, a charging power of up to 11 kW can be provided between a fourth charging power 105d via a CEE connector. With a connection to a protective contact or Schuko charging socket, a fifth charging power 105e of up to 2.4 kW can be provided.

The high-voltage DC-DC converters presented on the basis of the diagram from FIG. 1 are often used in a charging network of a battery-electric vehicle for DC or direct current charging. Such DC-DC converters in the vehicle are connected to the battery 113 and can be connected to a DC or direct current charging socket or socket of a respective charging infrastructure 101a, 101b, 101c, 101d. This makes it possible, among other things, to charge a battery with an 800 V layout at a 400 V DC charging station.

Figure 3:
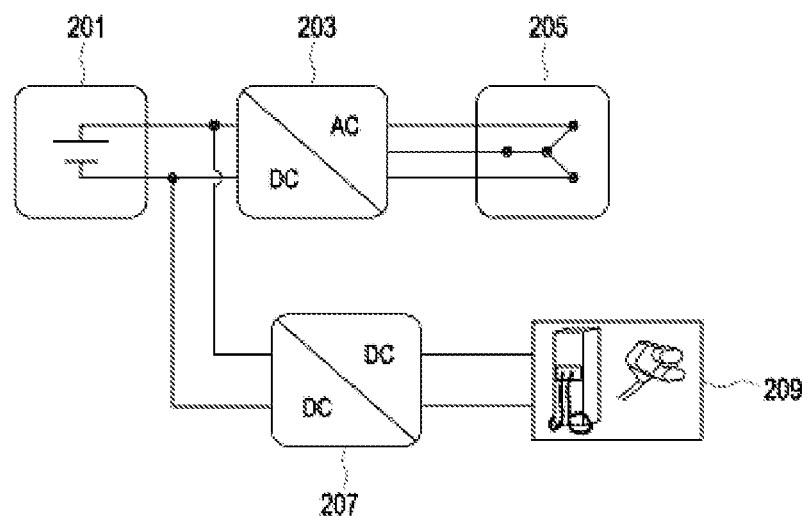
FIG. 3 shows a schematic representation of a high-voltage system topology to use a DC-DC converter for charging and traction purposes in a vehicle.

Reference is also made to FIG. 3, which shows the high-voltage system topology with a charging network for a vehicle. This charging network comprises a battery 201 which is connected to a DC-AC converter 203, which in turn is connected to an electric motor 205 of the vehicle. In addition, a DC-DC converter 207 is also connected in parallel to the DC-AC converter 203, via which DC-DC converter the battery 201 is to be connected to a charging infrastructure 209 in order to carry out a charging process. However, the DC-DC converter 207 is provided here exclusively for charging the battery 201.

Figure 4:
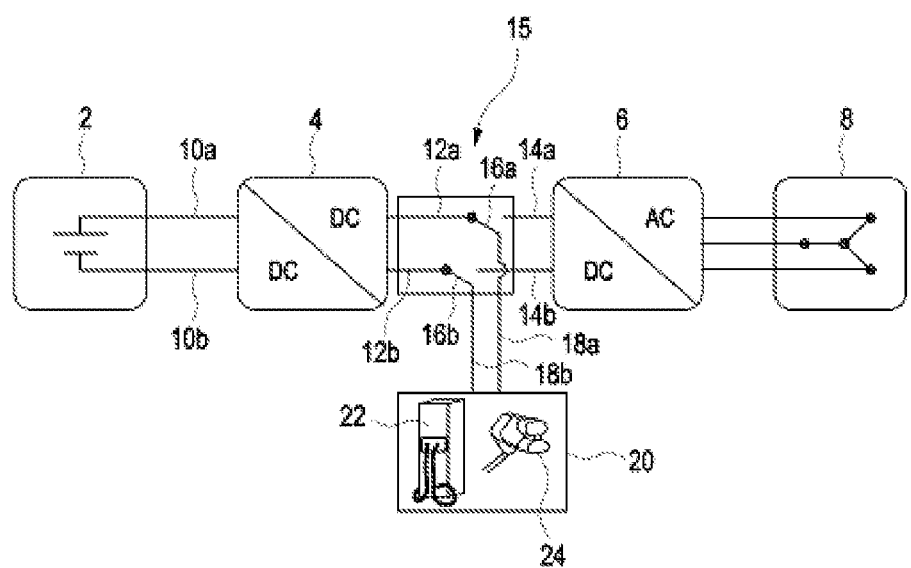
FIG. 4 shows a schematic representation of an embodiment of the system according to the invention for implementing an embodiment of the method according to the invention.

The embodiment of the system according to the invention shown schematically with reference to FIG. 4 is intended for an electrically driven vehicle, an electrically driven motor vehicle in this case. This system has a battery 2, a DC-DC converter 4, a switch 15, a DC-AC converter 6, and an electric motor 8. The battery 2 and the DC-DC converter 4 are connected to one another via two lines 10a, 10b. The switch 15 is connected to the DC-DC converter 4 on one side via two lines 12a, 12b and connected to the DC-AC converter 6 on the other side via two further lines 14a, 14b, which DC-AC converter in turn is connected to three phases of the electric motor 8. Furthermore, the switch 15 is connected to a charging plug of the system, not shown here, via two additional lines 18a, 18b. A charging infrastructure 20, which has an electrical charging station 22 and a charging cable with a charging socket 24, can be connected to this charging plug.

It is provided that the switch 15 has two switching elements 16a, 16b. Two switching states are provided for the switch 15 in this case.

In a first switching state of this switch 15, a first switching position is provided for each of the two switching elements 16a, 16b, the first switching element 16a connecting the two lines 12a, 14a and thus the DC-DC converter 4 and the DC-AC converter 6 to one another, in which, in this first switching state, the electric motor 8 is also connected to the battery 2, it being possible to carry out a traction process for the vehicle. In this first switching state, the DC-DC converter 4 is disconnected from the charging infrastructure 20.

In addition, a second switching state is provided for the switch 15, each of the two switching elements 16a, 16b being in a second switching position. In this case, the DC-DC converter 4 and the DC-AC converter 6 are isolated from one another. Furthermore, the two lines 12a, 12b are connected, via the switching elements 16a, 16b, to the additional lines 18a, 18b and thus to the charging plug of the system and thus also of the vehicle. Furthermore, the DC-DC converter 4 and the battery 2 are thus also connected to the charging plug of the vehicle. To carry out a charging process, the charging plug of the vehicle must be connected to its charging station 22 via the charging socket 24 of the charging infrastructure 20.

LIST OF REFERENCE NUMERALS

2 Battery
4 DC-DC converter
6 DC-AC converter
8 Electric motor
10a, 10b Line
12a, 12b Line
14a, 14b Line
15 Switch
16a, 16b Switching element
18a, 18b Line
20 Charging infrastructure
22 Charging station
24 Charging socket
101a, 101b Charging infrastructure
101c, 101d Charging infrastructure
103a, 103b Voltage mode
103c, 103d Voltage mode
105a, 105b Charging power
105c, 105d Charging power
105e Charging power
107a, 107b Connection
107c Connection
109 DC charger
111 AC charger
113 Battery
201 Battery
203 DC-AC converter
205 Electric motor
207 DC-DC converter
209 Charging infrastructure

The invention claimed is:

1. A system for a vehicle comprising:
a batter;
a DC-DC converter;
a DC-AC converter;
an electric motor; and
a switch, wherein the battery is connected to the DC-DC converter, the DC-AC converter is connected to the electric motor, the switch is arranged between the DC-DC converter and the DC-AC converter, and the switch is configured,
in a first switching state, to electrically connect the DC-DC converter and the DC-AC converter and to permit an exchange of electrical energy between the battery and the electric motor in order to carry out a traction process, and the switch is configured,
in a second switching state, to electrically isolate the DC-DC converter and the DC-AC converter, to connect the battery to an electrical charging station, and to permit an exchange of electrical energy between the battery and the electric charging station in order to carry out a charging process, wherein the first switching state of the switch is set automatically while the vehicle is in motion and the second switching state of the switch is set automatically during the charging process of the vehicle.

2. The system according to claim 1, which has a charging plug which is connected to the switch, wherein the switch is further configured, in the second switching state, to connect the battery to the charging station via the DC-DC converter and the charging plug.

3. The system according to claim 1, wherein the switch is further configured to increase or decrease an electrical voltage.

4. The system according to claim 1, which has a mechanism which is configured to detect a change between the traction process and the charging process and vice versa and to automatically set a respectively provided switching state for the switch.

5. The system according to claim 1, which is configured for a combined charging and traction network of the vehicle.

6. A method for supplying a vehicle with electrical energy, with a system having a battery, a DC-DC converter, a DC-AC converter, an electric motor, and a switch, wherein the battery is connected to the DC-DC converter and the DC-AC converter is connected to the electric motor, wherein the switch is arranged between the DC-DC converter and the DC-AC converter, the method comprising:
  electrically connecting the DC-DC converter and the DC-AC converter with the switch, in a first switching state, wherein the switch enables an exchange of electrical energy between the battery and the electric motor in order to carry out a traction process; and
  electrically isolating the DC-DC converter and the DC-AC converter and connecting the battery to an electrical charging station with the switch, in a second switching state, wherein the switch enables an exchange of electrical energy between the battery and the electric charging station in order to carry out a charging process, wherein the first switching state of the switch is set automatically while the vehicle is in motion and the second switching state of the switch is set automatically during the charging process of the vehicle.

7. The method according to claim 6, further comprising: setting the first switching state of the switch while the vehicle is in motion; and setting the second switching state while the vehicle is being charged.

8. The method according to claim 6, further comprising: setting the second switching state automatically for the switch when a charging cover of the system is opened and/or when a charging plug of the system has contact with the charging station.

9. The system according to claim 2, wherein the switch is further configured to increase or decrease an electrical voltage.

10. The system according to claim 2, which has a mechanism which is configured to detect a change between the traction process and the charging process and vice versa and to automatically set a respectively provided switching state for the switch.

11. The system according to claim 3, which has a mechanism which is configured to detect a change between the traction process and the charging process and vice versa and to automatically set a respectively provided switching state for the switch.

12. The system according to claim 2, which is configured for a combined charging and traction network of the vehicle.

13. The system according to claim 3, which is configured for a combined charging and traction network of the vehicle.

14. The system according to claim 4, which is configured for a combined charging and traction network of the vehicle.

15. The method according to claim 7, further comprising:
  setting the second switching state automatically for the switch when a charging cover of the system is opened and/or when a charging plug of the system has contact with the charging station.

* * * * *